G. W. WILKIN AND J. P. KEE.
TRANSMISSION CLUTCH FOR MOTOR VEHICLES.
APPLICATION FILED MAY 8, 1918.
1,330,506.
Patented Feb. 10, 1920.
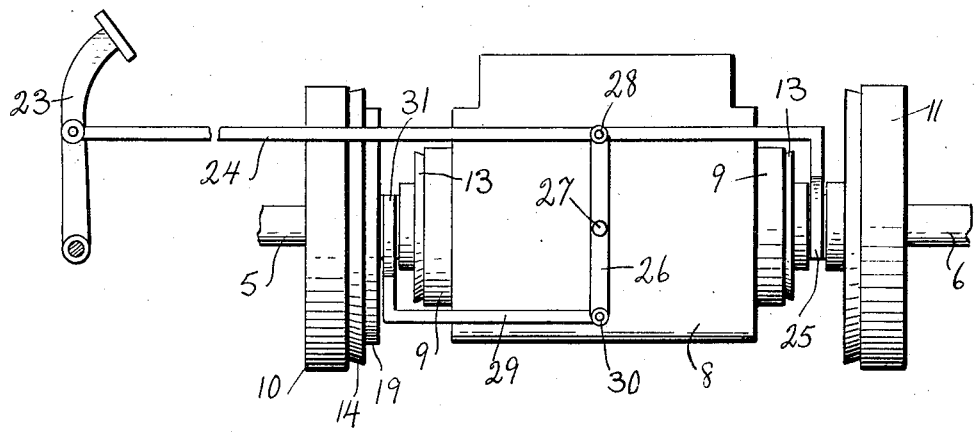
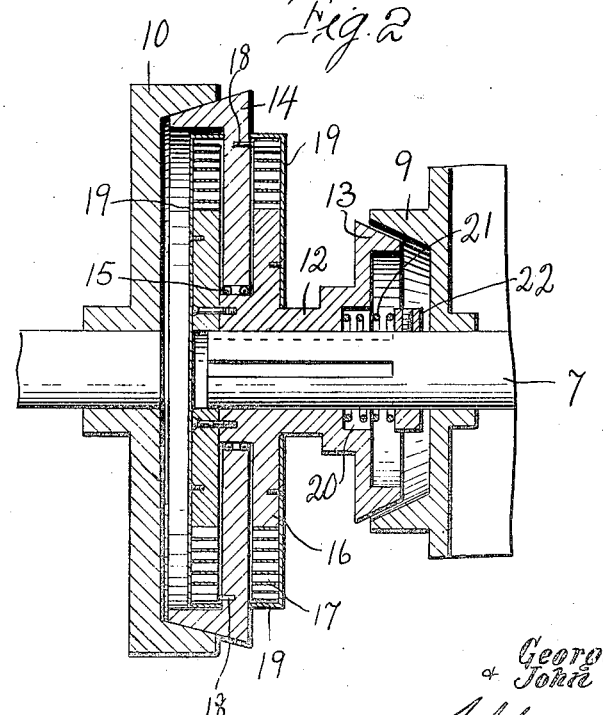

UNITED STATES PATENT OFFICE.

GEORGE W. WILKIN AND JOHN P. KEE, OF GRANGEVILLE, IDAHO.

TRANSMISSION-CLUTCH FOR MOTOR-VEHICLES.

1,330,506.  Specification of Letters Patent.  Patented Feb. 10, 1920.

Application filed May 8, 1918. Serial No. 233,261.

*To all whom it may concern:*

Be it known that we, GEORGE W. WILKIN and JOHN P. KEE, citizens of the United States, residing at Grangeville, in the county of Idaho and State of Idaho, have invented certain new and useful Improvements in Transmission-Clutches for Motor-Vehicles, of which the following is a specification, reference being had to the accompanying drawings.

This invention relates to an improved transmission clutch for motor vehicles, and has for its primary object to provide simple and effective means for quickly releasing the transmission gearing from connection with both the driving and driven shafts when the gears are shifted to change the driving speed, and thereby obviate liability of stripping or mutilating the gears.

It is one of the detail objects of the invention to provide improved means for effectively absorbing shock or jar when the clutch is shifted to its driving position.

And it is a further general object of my invention to provide a device for the above purpose which is simple and durable in its construction, reliable and serviceable in practical use, and which can be readily embodied in the power transmission system of the ordinary motor vehicle at relatively small cost.

With the above and other objects in view the invention consists in the improved combination, construction and relative arrangement of the several parts as will be hereinafter more fully described, subsequently claimed and illustrated in the accompanying drawing in which similar reference characters designate corresponding parts throughout the several views, and wherein:—

Figure 1 is an elevation illustrating one embodiment of our improved transmission clutch; and Fig. 2 is an enlarged vertical section thereof.

Referring in detail to the drawing, 5 designates the driving shaft, 6 the driven shaft and 7 the transmission shaft, which is interposed between the driving and driven shafts and in axial alinement therewith. 8 designates the case for the transmission gearing (not shown) in which the shaft 7 is suitably mounted, said shaft projecting beyond the opposite end walls of the case. Upon the exterior of each end wall of the gear case 8 is a cone clutch face 9.

To the end of the driving shaft 5, the female clutch disk 10 is fixed, and a similar clutch disk 11 is also fixed upon the end of the driven shaft 6. The shiftable clutch means for connecting the transmission shaft 7 to the driving and driven shafts, is identical in each instance, and it will therefore be understood that the full detail description of one of these clutch means will suffice for both.

Upon the end of the transmission shaft 7, a hub or sleeve 12 is splined or keyed for sliding movement. Upon one end of this hub a cone clutch disk 13 is formed for engagement with the clutch face 9 and upon the opposite end of the hub 12 a relatively large cone clutch disk 14 is rotatably mounted upon the ball bearings indicated at 15. This disk is adapted for engagement with the clutch face of the disk 10 or 11. By reference to Fig. 2, it will be noted that the left hand end of the hub 12 is in the form of a peripherally grooved flange or drum 16 and between the spaced portions of this flange the wall of the clutch disk 14 is engaged. To the periphery of the flange 16 at each side of the clutch disk 14, one end of a coiled spring 17 is secured, the other end of the spring being fixed to the face of the disk 14, as at 18. These springs wind in relatively opposite directions, one spring tending to rotate the clutch disk on the hub 12 in a clockwise direction while the other spring tends to rotate said disk in a counter-clockwise direction. Preferably, sheet metal housings 19 are secured to the flange 16 to house or inclose the springs 17.

The inner end of the shiftable clutch hub 12 is formed with a recess 20 to receive one end of a coil spring 21 surrounding the transmission shaft 7, the other end of said spring bearing against a collar 22 fixed on said shaft. This spring normally acts to yieldingly urge the hub 12 outwardly on the shaft 7 and engage the cone clutch member 14 with the clutch face of the disk 10. Thus, it will be understood that normally the transmission shaft is operatively clutched to the driving and driven shafts for the transmission of power through said latter shaft and the usual differential gearing and to the rear wheel axle of the vehicle.

The shiftable clutch elements are simultaneously operated through the medium of a foot pedal 23. One end of a rod 24 is pivotally connected to this pedal intermediate of its ends and is provided at its other end with an angularly extending yoke 25 engaged in a peripheral groove formed in one of the clutch hubs 12. A lever 26 is fulcrumed intermediate of its ends upon one side of the transmission gear case 8 as shown at 27 and the upper end of this lever is pivoted as at 28 to the rod 24. To the lower end of said lever, one end of a rod 29 is pivotally connected, as at 30, and the other end of said rod is provided with the angularly extending yoke 31 engaged in the peripheral groove of the other clutch hub 12. It will thus be apparent that when the foot pedal 23 is moved in one direction, the double clutch members at opposite ends of the power transmission shaft will be simultaneously moved inwardly and the clutch disk 14 disengaged from the clutch disks 10 and 11 respectively. The transmission gearing having thus been operatively disconnected from the driving and driven shafts, the gears can now be shifted to establish a predetermined driving relation without liability of stripping the gear teeth or otherwise breaking or mutilating the gear elements. When the double clutch members are thus shifted, the clutch disks 13 are engaged with the clutch faces 9 on the opposite ends of the transmission gear case 8 so that continued rotation of the shaft 7 by its own momentum instantly ceases. As soon as pressure on the foot pedal 23 is released, the springs 21 act to force the clutches outwardly on the ends of the transmission shaft and again engage the disks 14 with the faces of the disks 10 and 11 so that power will again be transmitted from the engine or driving shaft to the rear axle of the vehicle. There will, however, be an initial independent rotation of the clutch disk 14, and the spring 17 connected to one side of each disk will be coiled or placed under tension while the spring at the opposite end of the disk will be uncoiled, said springs acting in opposition to each other. Thus, there is provided a cushioning means for the shock or jar which would otherwise be transmitted to the body of the vehicle when the clutches are thrown into driving engagement with the clutch disks 10.

From the foregoing description taken in connection with the accompanying drawing, the construction, manner of operation and several advantages of our invention will be clearly and fully understood. We have shown in the drawing, a particular form of the clutch elements, but it will of course be manifest that any other approved type of clutch may be substituted therefor. By means of the device, the gears may be safely shifted without injury, irrespective of the speed at which the vehicle is being operated. The manually operable means which we have herein illustrated for simultaneously shifting the double clutch members, is merely suggestive and is not to be considered as a limitation, since various other mechanical means for shifting the clutch elements which could be substituted therefor, will readily suggest themselves to one skilled in the art. The several parts of our device are all of exceedingly simple form, strong and durable in construction, and not liable to get out of order. The invention may therefore be manufactured and incorporated in motor vehicles equipped with various types of power transmission systems now generally used, without necessitating radical modifications therein and also at comparatively small cost.

While we have herein shown and described the preferred construction and relative arrangement of the several parts, it is to be understood that the device is susceptible of considerable modification, and we therefore reserve the privilege of adopting all such legitimate changes as may be fairly embodied within the spirit and scope of the invention as claimed.

We claim:

1. The combination with the driving, transmission and driven shafts of a motor vehicle, of manually operable means for disconnecting the transmission shaft from the driving and driven shafts and simultaneously arresting the rotary momentum of the transmission shaft.

2. The combination with the driving, transmission and driven shafts of a motor vehicle, of means simultaneously operable to disconnect the transmission shaft from both the driving and driven shafts and also arresting the rotary momentum of the transmission shaft.

3. The combination with the driving, transmission and driven shafts of a motor vehicle, clutch elements fixed to the driving and driven shafts, clutch elements on the ends of the transmission shaft opposed to the clutch elements on the driving and driven shafts respectively and shiftable longitudinally on the transmission shaft, means yieldingly urging the latter clutch elements to their operative positions, manually operable means for simultaneously shifting said clutch elements out of driving relation to the first named clutch elements, and means operable with the shiftable clutch elements to arrest the rotary momentum of the transmission shaft.

4. The combination with the driving, transmission and driven shafts of a motor vehicle, of clutch elements fixed upon the driving and driven shafts, complementary clutch elements shiftable on the ends of the transmission shaft, means normally urging the latter clutch elements into operative engagement with the respective first named clutch elements, additional clutch members movable as a unit with the respective shiftable clutch elements, manually operable means for simultaneously shifting the clutch elements to disconnect the transmission shaft from the driving and driven shafts, and relatively stationary parts for engagement by said last named clutch members to arrest the rotary momentum of the transmission shaft.

In testimony whereof we hereunto affix our signatures in the presence of two witnesses.

GEORGE W. WILKIN.
JOHN P. KEE.

Witnesses:
R. H. RUSSELL,
M. REESE HATTABAUGH.